Oct. 16, 1928.
F. H. LAMB
1,687,840
RAIL CONNECTING ROD
Filed Aug. 23, 1926
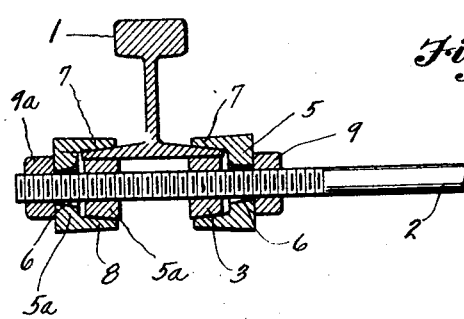
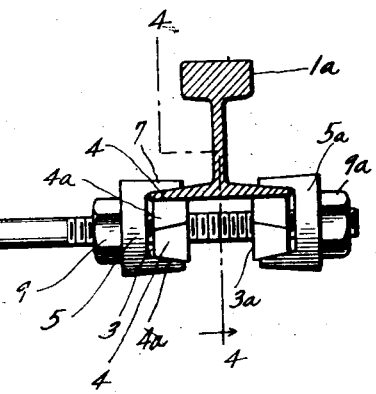
Fig.1
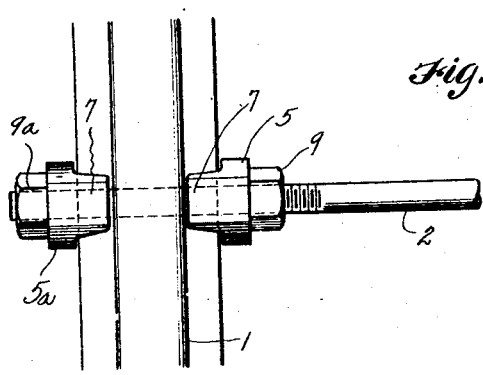
Fig.2
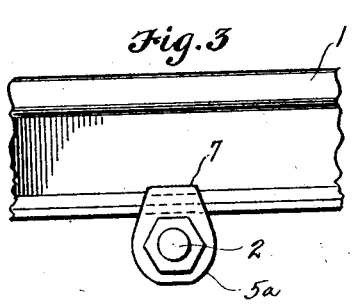
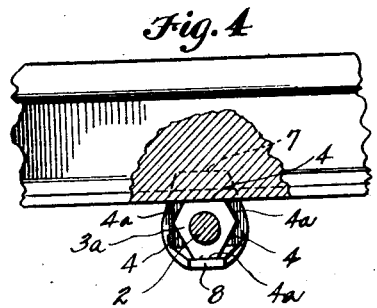
Fig.3   Fig.4
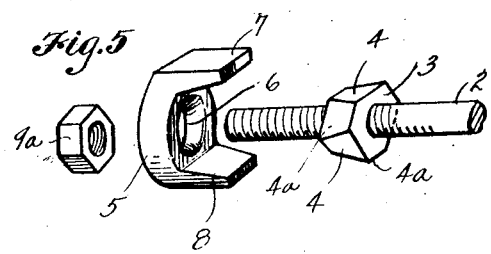
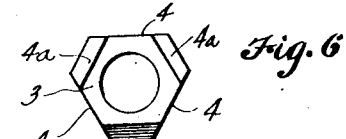
Fig.5   Fig.6
INVENTOR
FRANK H. LAMB
BY
Richard Cook
ATTORNEY Patented Oct. 16, 1928.

1,687,840

UNITED STATES PATENT OFFICE.

FRANK H. LAMB, OF HOQUIAM, WASHINGTON.

RAIL-CONNECTING ROD.

Application filed August 23, 1926. Serial No. 131,035.

This invention relates to improvements in spacing or tie rods for connecting the rails of car tracks; the principal object of the invention being to provide means that may be easily applied or removed, whereby the rails of a track may be securely held at any desired spacing, and which is adjustable to adapt it for application to rails of different size and to tracks of different gauge.

More specifically, the object of the invention resides in the provision of a rail connection of the above character, comprising a cross rod onto which, at its opposite ends, wedge nuts, yokes and clamping nuts of a special form of construction are adjustably mounted to suit rails of various size and tracks of different gauge, and are so arranged that when tightened together the action of the yokes against the wedge nuts and against the inclined, upper surfaces of the base flanges of the rails will provide a rigid, fixed connection between the ends of the rod and the rails.

Other objects of the invention resides in the various details of construction of the wedge nuts and yokes and in their relation to the base flange of a rail and to each other.

In accomplishing these and other objects of the invention, I have provided the improved details of construction, the preferred forms of which are illustrated in the following drawings, wherein—

Figure 1 is a transverse section of a car track showing the rails joined by a connecting means embodied by the present invention; certain parts being in section for better illustration.

Figure 2 is a plan view of the same, with one of the rails shown in dotted lines and the connecting parts in horizontal section.

Figure 3 is an end view of the connecting means, showing one of the clamping yokes and its retaining nut.

Figure 4 is a sectional view taken on the line 4—4 in Figure 1.

Figure 5 is a perspective view of the parts at one end of the connecting rod shown in disassembled relation.

Figure 6 is a face view of one of the special wedge nuts used in the construction.

Referring more in detail to the drawings—

1 and 1ª designate the rails of a car track which are joined by a connecting device embodied by the present invention, comprising a cross rod 2 that is threaded at its opposite ends, and, at each end, has a pair of wedge nuts 3 and 3ª threaded thereonto in spaced relation. Each of these nuts is of a special hexagonal form of construction, in that it comprises three perfectly flat surfaces 4 that are formed in planes that are parallel with the axis of the nut and which has three flat surfaces 4ª alternating with the surfaces 4 and arranged directly opposite the surfaces 4 which are formed in planes that are inclined equally and in the same direction with respect to the axis of the nut. The nuts 3 and 3ª are so adjusted on the rod that flat surfaces 4 thereof will fit flatly against the flat under surface of the base flange of the rail adjacent its opposite edges and surfaces 4ª of these nuts will be facing directly downward.

Slidable on the rod, adjacent the nuts 3 and 3ª respectively, are paired yokes 5 and 5ª. Each of these has an enlarged opening 6 through which the rod 2 extends and has a laterally extending flange 7 at its upper edge adapted to overlie the adjacent edge of the base flange of the rail directly above the corresponding nut 3 or 3ª, and has a similar flange 8 at its lower edge adapted to slidably engage upon the inclined lower surface of the wedge nut. The inner surface of the upper flange 7 of the yoke is inclined according to the slope of the top surface of the base flange of the rail with which it engages, and the top surface of the flange 8 is inclined according to the slope of the surface 4ª of the wedge nut with which it engages.

Threaded onto the rod, at the outer side of each of the yokes, are clamping nuts 9 and 9ª, and these are adapted to be tightened against the yokes so as to draw them inwardly toward the wedge nuts in such manner that their flanges 7 and 8, engaging with the inclined surfaces of the nuts 3 and 3ª and the oppositely inclined top surfaces of the base flange of the rail, will cause the upper flange of the yokes to be clamped tightly against the base flange to hold the rail securely against the upper surfaces of the nuts 3 and 3ª.

In applying the device to a track, the inner nuts 9 are first threaded onto the rod; then the inner yokes 5 are slipped onto the rod; then the wedge nuts 3 and 3ª are threaded onto the rod and are adjusted a distance apart approximately equal to the width of the base flange of the rail and with flat surfaces 4 seated against the under surface of the latter. The yokes are then slipped toward the wedge nuts so that their flanges 7 will overlie the edges of the base flange of the rail and their lower flanges 8 will engage the inclined surfaces of the under sides of the wedge nuts. The nuts 9 and 9ª are then threaded along the rod and are tightened against the yokes to draw them toward the wedge nuts and rail, so that the flanges of the yokes, riding up the oppositely inclined surfaces of the wedge nuts and the base flange of the rail, will cause the parts to be clamped tightly together and a rigid, fixed connection provided between the rod and the rails.

It is readily apparent that a connecting device of this character may be adjusted to tracks of different gauge and also to rail flanges of different thickness and width. It is also apparent that such devices may be easily and quickly removed or applied.

Having thus described my invention, what I claim as new therein and desire to secure by Letters Patent, is:

1. A rail tie of the character described, comprising a cross rod, wedge members threaded on the rod for engagement with the under surfaces of the base flanges of the rails, yokes adjustable on the rod and adapted for overlapping flanges of the rails in opposed clamping relation to said wedge members and clamping nuts threaded on the rod for tightening the yokes against the rail flanges and wedge members.

2. A rail tie of the character described, comprising a cross rod, wedge nuts threaded on the rod for engaging the under surfaces of the base flanges of the rails, yokes slidable on the rod having flanges overlapping the edges of the base flanges of the rails and having other flanges engaging the under sides of the wedge nuts and clamping nuts threaded on the rod for drawing the yokes toward the wedge nuts and rail flanges.

3. A rail tie of the character described, comprising a cross rod, wedge nuts adjustably threaded on the rod having flat surfaces adapted to seat against the flat under surfaces of the base flanges of the rails to be connected and having sloping opposite side surfaces, yokes slidable on the rod adjacent the wedge nuts having flanges overlapping the edges of the base flanges of the rails and having other flanges engaging the sloping faces of the wedge nuts and clamping nuts threaded on the rod for drawing the yokes onto the wedge nuts.

4. A rail tie of the character described comprising a cross rod, a pair of wedge nuts threaded onto each end of the rod in spaced relation beneath the opposite side edges of the base flanges of the rails, each nut having a plurality of surfaces adapted to flatly engage with the flat under surfaces of the base flanges of the rails and having diametrically opposite surfaces that are inclined with respect thereto, yokes slidable on the rod having upper flanges overlapping the upwardly inclined top surfaces of the base flanges of the rails and having lower flanges seated against the inclined under surfaces of the wedge nuts, and clamping nuts threaded onto the rod to draw the yokes inwardly onto the wedge nuts and rails flanges.

Signed at Hoquiam, Washington, this 16th day of July, 1926.

FRANK H. LAMB.